United States Patent
Andreae et al.

(10) Patent No.: US 10,457,493 B1
(45) Date of Patent: Oct. 29, 2019

(54) INDEXING CONVEYOR SYSTEM AND METHOD

(71) Applicant: SST Systems, Inc., Sturgeon Bay, WI (US)

(72) Inventors: Chad M. Andreae, Sturgeon Bay, WI (US); Jeffrey Alan Wienke, Marengo, IL (US)

(73) Assignee: SST Systems, Inc., Sturgeon Bay, WI (US)

( * ) Notice: Subject to any disclaimer, the term of this patent is extended or adjusted under 35 U.S.C. 154(b) by 0 days.

(21) Appl. No.: 16/058,084

(22) Filed: Aug. 8, 2018

(51) Int. Cl.
  *B65G 43/00* (2006.01)
  *B65G 19/02* (2006.01)
  *B05C 3/09* (2006.01)
  *C23G 5/00* (2006.01)
  *B08B 3/08* (2006.01)
  *B65G 49/04* (2006.01)

(52) U.S. Cl.
  CPC ............... *B65G 43/00* (2013.01); *B05C 3/09* (2013.01); *B08B 3/08* (2013.01); *B65G 19/025* (2013.01); *B65G 49/04* (2013.01); *B65G 49/0436* (2013.01); *C23G 5/00* (2013.01); *B65G 2203/0233* (2013.01)

(58) Field of Classification Search
  CPC .... B65G 49/02; B65G 49/04; B65G 49/0413; B65G 49/0459; B65G 49/0463; B65G 49/0436; B65G 49/0454; B05C 3/02; B05C 3/10; B05D 1/18; C25D 13/22; C25D 17/06
  USPC ............. 198/346.1, 346.2, 346.3; 427/430.1; 204/225, 226
  See application file for complete search history.

(56) References Cited

U.S. PATENT DOCUMENTS

| | | | | |
|---|---|---|---|---|
| 1,634,849 | A | * | 7/1927 | Powell ............... B65G 49/0454 204/226 |
| 2,707,053 | A | | 4/1955 | Browning |
| 3,567,040 | A | | 3/1971 | Thomson |
| 3,760,927 | A | * | 9/1973 | Zambon ............. B65G 49/0463 198/346.3 |
| 4,192,331 | A | | 3/1980 | Koering |
| 4,286,722 | A | | 9/1981 | Tax et al. |
| 4,351,266 | A | * | 9/1982 | Ando ..................... C25D 17/06 118/425 |
| 4,648,777 | A | * | 3/1987 | Eichenauer ............ B65G 49/04 104/89 |
| 4,812,211 | A | | 3/1989 | Sakai |

(Continued)

OTHER PUBLICATIONS

"Moving Basket Electrodeposition Coating Plant" product description page dated Oct. 28, 2011, believed to be of Tae Kwang General Machine Co., Ltd.

(Continued)

*Primary Examiner* — James R Bidwell
(74) *Attorney, Agent, or Firm* — Michael Best & Friedrich LLP (57) ABSTRACT

An indexing conveyor system including a work station skipping device. The conveyor system has a rail situated above a plurality of same-length work stations along a path of conveyance. The work station skipping device is operable to engage a load and transfer the load from a first conveyor carriage to a second, further downstream carriage for advancing more than one work station length so that the load skips over a predetermined one of the plurality of work stations.

20 Claims, 9 Drawing Sheets

(56) References Cited

U.S. PATENT DOCUMENTS

| | | | |
|---|---|---|---|
| 4,883,184 | A | 11/1989 | Klbus |
| 5,012,918 | A * | 5/1991 | Acker .................... B65G 47/61 |
| | | | 104/127 |
| 5,151,006 | A | 9/1992 | Marttila et al. |
| 5,257,891 | A | 11/1993 | Baumann et al. |
| 5,765,703 | A | 6/1998 | Shiwaku |
| 6,126,023 | A | 10/2000 | Durrant-Whyte et al. |
| 7,287,740 | B2 | 10/2007 | Reyes et al. |
| 9,468,944 | B2 | 10/2016 | Andreae et al. |
| 2004/0149542 | A1 | 8/2004 | Kyotani |
| 2008/0093322 | A1 | 4/2008 | Ehrenleitner |
| 2008/0121601 | A1 | 5/2008 | Ehrenleitner |
| 2011/0017132 | A1 | 1/2011 | Robbin |
| 2013/0264302 | A1 | 10/2013 | Andreae et al. |
| 2014/0342092 | A1 * | 11/2014 | Andreae .................... B05C 3/10 |
| | | | 427/430.1 |

OTHER PUBLICATIONS

"Material-Handling System Allows High-Volume Finishing in Less Space" Therma-Tron-X, New Product Post Feb. 8, 2018, https://www.pfonline.com/products/material-handling-system-allows-high-volume-finishing-in-less-space, retrieved from the Internet Oct. 18, 2018.

"Therma-Tron-X's SlideRailTransfer System Minimizes Material Handling Time" New Product Post Oct. 1, 2015, https://www.pfonline.com/products/therma-tron-xs-sliderail-transfer-system-minimizes-material-handling-time, retrieved from Internet Oct. 19, 2018.

* cited by examiner

INDEXING CONVEYOR SYSTEM AND METHOD

BACKGROUND

The present invention relates to conveyor systems, and more particularly to conveyor systems that index loads through discrete work stations, such as sequential dip tanks within a finishing process line for manufactured work pieces. Commonly known finishing process lines may include, among these dip tanks, acid baths containing acidic liquid solutions.

SUMMARY

In one aspect, the invention provides a conveyor system including a rail defining a path of conveyance, and a plurality of sequential work stations positioned along the path of conveyance. A plurality of carriages are slidable along the rail, the plurality of carriages include a first carriage supporting a load through the plurality of sequential work stations, and a second carriage in a leading or downstream position with respect to the first carriage, the second carriage being unloaded. An indexing system is adapted to drive the plurality of carriages in discrete steps, each step advancing the plurality of carriages by an index length equal to a length of each of the plurality of sequential work stations. A work station skipping device is operable to engage the load and transfer the load from the first carriage to the second carriage for skipping over a predetermined one of the plurality of sequential work stations.

In another aspect, the invention provides a method of operating a conveyor system of a finishing process line having a plurality of sequential work stations for processing a plurality of conveyed loads, one of the plurality of sequential work stations defining a designated dip tank to be skipped by a designated one of the plurality of conveyed loads. With the conveyor system, the plurality of conveyed loads are registered with the plurality of sequential work stations so that each of the plurality of loads is positioned above a respective dip tank corresponding to the plurality of sequential work stations. A first lowering of the plurality of conveyed loads, including the designated load, into the respective dip tanks is performed with the conveyor system. With the conveyor system, the plurality of conveyed loads are raised out of the respective dip tanks. The conveyor system is indexed to bring the designated load into registry with the designated dip tank. A work station skipping device is operated to engage the designated load and transport the designated load to a work station of the plurality of sequential work stations that is downstream of the designated dip tank. The operation of the work station skipping device occurs prior to a second lowering of the plurality of conveyed loads.

In yet another aspect, the invention provides an indexing conveyor system including a work station skipping device. The conveyor system has a rail situated above a plurality of same-length work stations along a path of conveyance. The work station skipping device is operable to engage a load and transfer the load from a first conveyor carriage to a second, further downstream carriage so that the load skips over a predetermined one of the plurality of work stations.

Other aspects of the invention will become apparent by consideration of the detailed description and accompanying drawings.

DETAILED DESCRIPTION

Before embodiments are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items.

Figure 1:
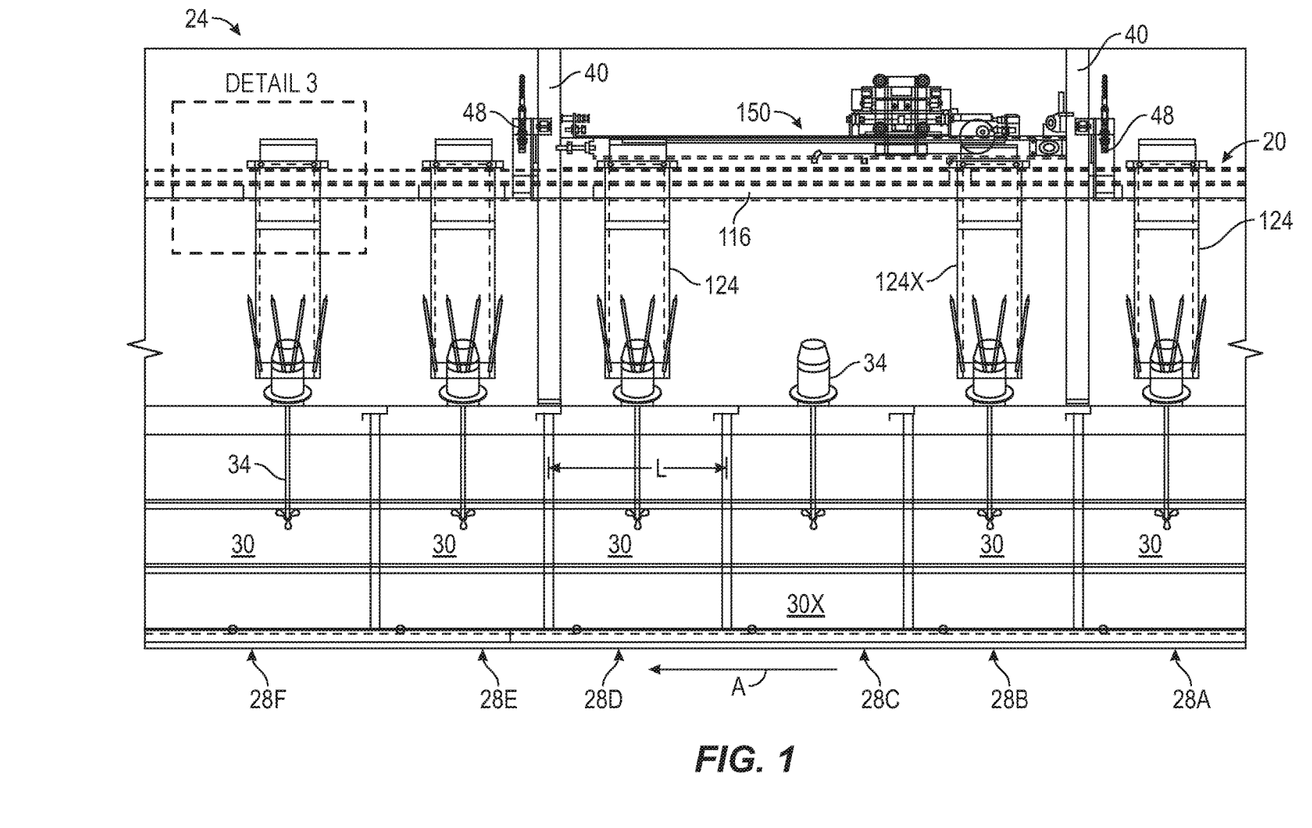
FIG. 1 is a side elevation view of a finishing process line including a conveyor system according to one embodiment of the present disclosure.
Figure 2:
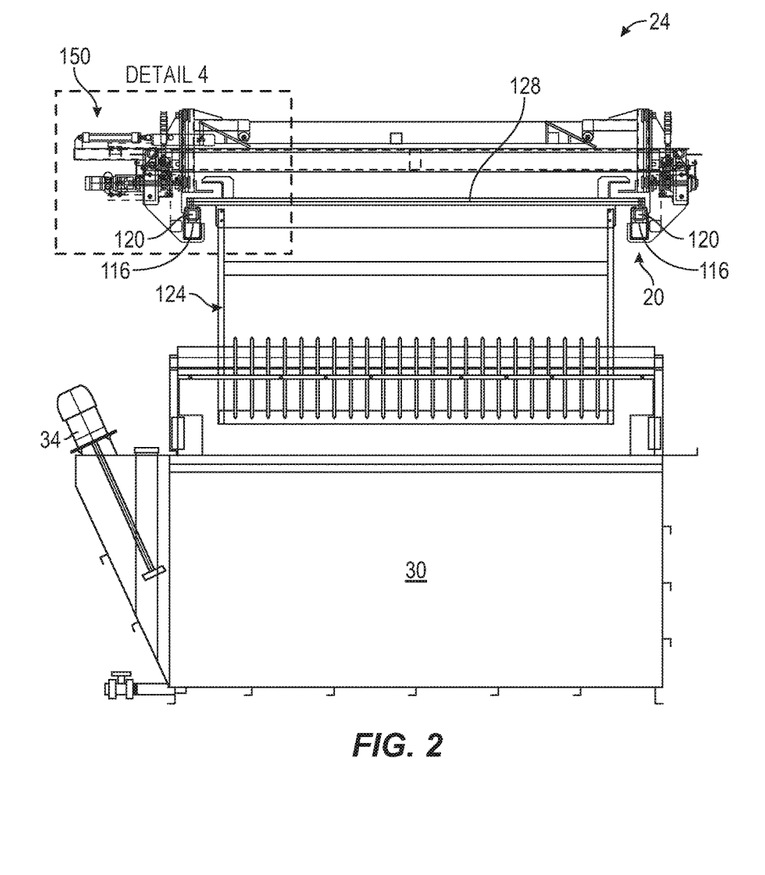
FIG. 2 is an end view of the finishing process line of FIG. 1.

FIGS. 1 and 2 are a side elevation view and an end view, respectively, of a portion of a conveyor system 20, which in some constructions may form part of a finishing process line 24 for applying a finish to manufactured work pieces (e.g., metal parts). As such, the line 24 can include a plurality of sequential work stations 28A-F along a conveyance direction A, or work flow path of conveyance. Some or all of the work stations 28A-F can include immersion tanks or "dip tanks" 30 filled with respective liquids for processing (e.g., cleaning, rinsing, and coating) work pieces conveyed along the line 24 by the conveyor system 20. The types and number of work stations can vary greatly among alternate constructions, and it will be understood that the line 24 can further include additional non-immersion work stations, such as spray stations, heating or oven sections, or inspection stations, among others. As illustrated in at least FIGS. 1 and 2, some or all of the dip tanks 30 can include a fluid mixer 34.

The conveyor system 20 includes a stationary frame, which may include a plurality of fixed posts 40. The stationary frame supports a plurality of rails 116, and in turn, a plurality of carriages 120 are supported by the rails 116. For example, the conveyor system 20 includes two laterally-spaced rails 116, and at a given location along the conveyance direction A, a laterally-spaced set of carriages 120 are engaged with the rails 116 to support an object 124 to be conveyed. However, it is also possible to construct the conveyor system having three or more rails 116, or a single rail 116. The carriages 120 are movable along the rails 116 in the direction of conveyance A. In some constructions, each carriage 120 may be in the form of a push tube or may have a push tube portion, for example a rectangular tube slidable along the corresponding rail 116 in the manner of a sliderail square transfer system (SST™ System developed by Therma-Tron-X, Inc.). The carriages 120 can have rollers 122 engaged with exterior or interior surfaces of the rails 116 to provide rolling support for the push tubes as they translate or "slide" with respect to the rails 116, which remain fixed in one position along the conveyance direction A. The rails 116 are movable in a vertical direction so that the conveyed loads can be lowered into and lifted out of the dip tanks 30. The rails 116 may also be movable independently of each other to some extent for tilting the loads. Vertical movements of the rails 116, relative to the stationary frame and the work stations 28A-F, can be effected by a process lift constituted for example by a plurality of lift drives 48 (e.g., electric motors along with suitable force transmission elements) supported on the stationary frame (e.g., on the fixed posts 40).

Each of the carriages 120 has a length (e.g., push tube length L) that matches the length of each of the work stations 28A-F, and may be referred to as the "index length" L. Each carriage 120 has ends 120A, 120B that abut the adjacent carriages 120 as clearly shown in FIG. 3 so that movement of an upstream one of the carriages 120 causes movement of all of the downstream carriages 120. Movement of all of the carriages 120 along the rails 116 is driven by a pusher mechanism (e.g., hydraulic cylinders, not shown) that engages the most upstream set of carriages 120 and strokes forward by a distance equal to the length of a work station and the length of one set of carriages 120, particularly the push tubes thereof. The pusher mechanism is one example of an indexing drive. Such a drive along with the unitized carriages 120 having the push tube portions forms an indexing system. The number of push tubes 120 at a given location along the plurality of rails 116 corresponds to the number of rails 116 (e.g., two). Although the particular push tube conveyance system is described herein for moving carriages 120 to different work stations along the conveyor system 20, it will be appreciated that the carriages 120 can be pushed, pulled, or otherwise moved to different positions along the rails 116 in any number of other known manners.

Figure 3:
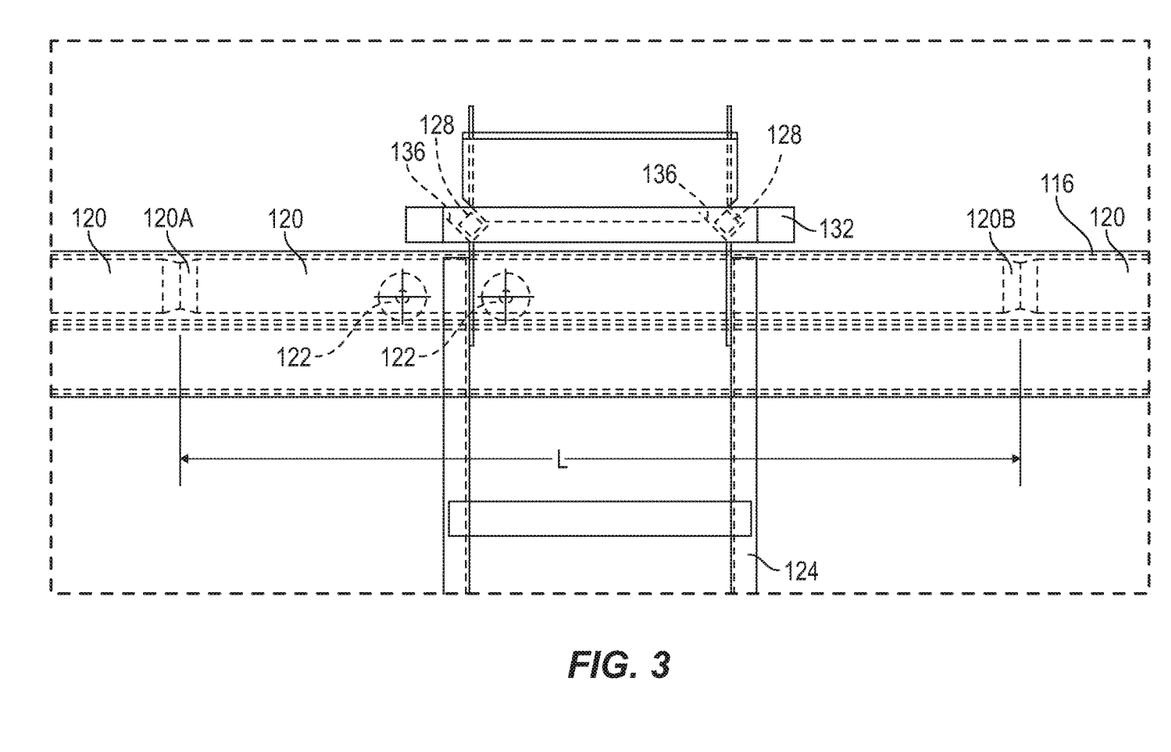
FIG. 3 is a detail view of a rail and carriage of the conveyor system of FIG. 1.

A load 124 is carried by the set of carriages 120 located at each common position or station 28A-F along the rails 116. As used herein, the "load" is the conveyed "object" or "item", which can refer directly to a manufactured part or "work piece" to be processed by the line 24 or, alternately, to a fixture, container, bin, basket, etc. used for holding one or a plurality of work pieces to be processed by the line 24. Regardless of whether the conveyed load 124 is a part that is worked upon or another structure configured to carry one, two, or more parts, the load 124 has at least one load bar 128, and each load bar 128 is engageable with a set of carriages 120. For example, as shown in FIG. 3, each load 124 includes a pair of load bars 128 spaced along the conveyance direction A, and each carriage 120 includes a support section or portion 132 configured to receive and engage the two load bars 128. The support section 132 can extend above the push tube portion that is received by the corresponding rail 116. Although notches and load bars of other shapes may be used in other constructions, FIG. 3 illustrates how the support section 132 includes V-shaped notches 136 and the load bars 128 have a cross-sectional shape (e.g., diamond, rectangular, square) that includes opposed surfaces matching the surfaces forming the V-shaped notches 136.

In some embodiments, only one load 124 is present at each work station 28A-F at a given time. During indexing between work stations, the loads 124 are positioned entirely above the dip tanks 30, e.g., at maximum conveyor elevation. Once indexed to the work stations 28A-F, the loads 124 can be partially or entirely submerged in the liquids of the respective dip tanks 30 for processing. For example, the conveyor rails 116 may be moved to a minimum conveyor elevation that lowers the loads 124 with respect to the dip tanks 30, which are fixed in place and supported by a ground or floor surface. Because the rails 116 extend along the entire length of at least all the illustrated work stations 28A-F, all the loads 124 are lowered and raised in unison. Further, due to the indexing system indexing one index length L each time, each load 124 would normally be processed sequentially through all of the work stations 28A-F, each load 124 being processed at each work station 28A-F for a unit of time referred to as a process cycle time. However, a situation may arise where it is desired to have a designated load 124X skip the processing of a designated work station (shown herein as work station 28C) having a designated dip tank 30X. For this purpose, the conveyor system 20 includes a work station skipping device 150. In some constructions, the designated dip tank 30X may be an acid bath containing an acidic liquid solution (e.g., dilute phosphoric acid or dilute sulfuric acid). Although it is contemplated to provide a work station skipping device to merely prevent lowering of the designated load 124X into the designated dip tank 30X as the conveyor rails 116 lower to immerse the remaining loads 124, the illustrated work station skipping device 150 is advantageously operable to transfer the designated load to the next-in-line work station (shown herein as work station 28D) before the conveyor rails 116 commence their next lowering operation. Although this requires a vacant carriage $120_2$ ahead of the designated load 124X as described in further detail below, this configuration provides continuous processing of the designated load 124X, without initiating a dwell equivalent to the process cycle time for the designated load 124X above the designated dip tank 30X. Thus, the designated load 124X is not only protected from the liquid in the designated dip tank 30X, but is also further protected from any fumes present in the space directly above the designated dip tank 30X.

The work station skipping device 150 is operable to engage the designated load 124X and transfer this load 124X from a first carriage $120_1$ to a second carriage $120_2$ for skipping over the work station 28C containing the designated dip tank 30X. The first carriage $120_1$ is the carriage 120 on which the designated load 124X is conveyed prior to reaching the designated dip tank 30X. As illustrated, the designated load 124X is conveyed to the work station 28C of the designated dip tank 30X by the first carriage $120_1$. The second carriage $120_2$ is merely a vacant carriage located along the rails 116 at a further downstream position, e.g., directly adjacent in the downstream direction. The second carriage $120_2$ may be the carriage that conveys the designated load 124X through the remainder of the finishing process line 24. It will be appreciated that, in the case of a two-rail conveyor system 20 as shown with separate carriages 120 on each rail 116, the designated load 124X is initially conveyed upon two "first" carriages $120_1$ (one on the left rail and one on the right rail), and the work station skipping device 150 is operable to transfer the designated load 124X from the two "first" carriages $120_1$ to a pair of "second" carriages $120_2$.

Figure 4:
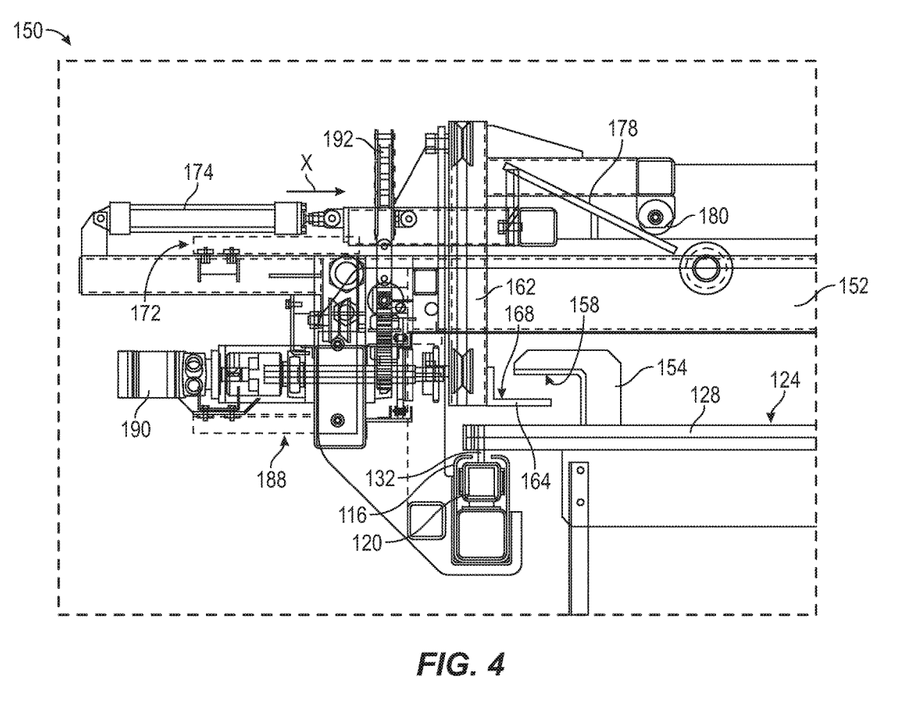
FIG. 4 is a detail end view of one side of a work station skipping device of the conveyor system.

With primary reference to FIG. 4, the work station skipping device 150 can include a stationary frame 152 fixed to the stationary frame (e.g., fixed posts 40) of the conveyor system 20. For example, the stationary frame 152 of the work station skipping device 150 can include a plurality of beams including at least one longitudinal beam extending parallel to the rails 116 and the direction of conveyance A and at least one transverse beam extending perpendicular to the direction of conveyance A, in particular, extending laterally between left and right rails 116. In order to facilitate engagement by the work station skipping device 150, at least the designated load 124X, and in some cases all loads 124, includes a lift flange 154. The lift flange 154 can be formed separate from the load bar(s) 128. As shown in FIG. 4, the lift flange 154 includes a downward-facing lift surface 158 that is free from contact prior to actuation of the work station skipping device 150, when the designated load 124X is simply supported by the first carriage $120_1$ with the load bars 128 received in the notches 136. The work station skipping device 150 has a lifting bar 162 with a lifting flange 164. The lifting flange 164 includes an upward-facing lifting surface 168 adapted to engage the lift surface 158 of the lift flange 154 on the designated load 124X to lift the designated load 124X off the first carriage $120_1$. A first drive mechanism 172 of the work station skipping device 150 is a lifting drive. The lifting drive 172 can include at least one actuator 174 operable of energization under direction of a controller to raise the lifting bar 162, and subsequently to control a return or lowering thereof. The actuator 174 can take different forms, such as a rotary motor, or alternately a linear actuator as shown. The actuator 174 can be powered by electrical energy, pneumatic energy, or hydraulic energy according to the desired system configuration. With continued reference to FIG. 4, one example of the lifting drive 172 includes a driven wedge mechanism including a wedge or ramped surface 178 and a wedged element, for example a roller 180 in contact with the ramped surface 178. The roller 180 is fixed to a bracket that is fixed to the lifting bar 162, and the motion of the lifting bar 162 is constrained to vertical motion. Upon energization of the actuator 174 from the position of FIG. 4 along direction X to an actuated position, the ramped surface 178 is driven into the roller 180, forcing the roller 180 (and with it the lifting bar 162) upward with respect to the rails 116. Reverse operation in a direction opposite the direction X allows the roller 180 and the lift bar 162 to return to their original vertical positions.

A second drive mechanism 188 of the work station skipping device 150 is an advancing drive. The advancing drive 188 can include at least one actuator 190 operable of energization under direction of a controller to advance the designated load 124X with respect to the rail 116 along the conveyance direction A (but separate from the normal indexing of the conveyor), from a position of the first carriage $120_1$ to a position of the second carriage $120_2$. Once the designated load 124X is at the second position, the lifting drive 172 is actuated in a reversing direction to deposit the designated load 124X onto the second carriage $120_2$ so that the load bars 128 are received into the notches 136. As illustrated, the actuator 190 can include an electric rotary machine or motor. The advancing drive 188 can also include any or all of: one or more gears, a gearbox, shafts having a shaft coupling, an endless drive member 192 (e.g., loop of belt or chain), and one or more wheels (e.g., pulleys or sprockets) drivingly engaged with the endless drive member 192. Whatever its particular construction, the advancing drive 188 is operable to effect back and forth drive of at least the lifting bar 162 with respect to the work stations 28A-F, independently of the conveyor rails 116. In some constructions, one or both of the lifting drive 172 and the advancing drive 188 also move with the lifting bar 162 relative to the stationary frame 152 during operation of the work station skipping device 150. Finally, it is noted that the above description of the work station skipping device 150 and its engagement with the designated load 124X is given with reference to components located adjacent one of the rails 116 (e.g., the left rail of a left-right pair of rails 116 as shown in FIG. 2), and that some or all of these components may be duplicated adjacent another one of the rails 116.

Following is a brief description of an exemplary method of operating the conveyor system 20 shown in the sequence of FIGS. 5-12, including operations of the work station skipping device 150 according to the illustrated construction described above. The particular method steps shown in FIGS. 5-12 may be preceded by a normal indexing mode of operation of the conveyor system 20. During the normal indexing mode of operation, the loads 124 are indexed as a group, sequentially among the sequential work stations 28A-F such that each load 124 is processed at each work station 28A-F, which may refer to immersion in the respective dip tanks 30. Each load 124 occupies a given work station 28A-F for a time period equal to the process cycle time. Although each load 124 is processed at a respective work station 28A-F during each consecutive process cycle time, each and every work station 28A-F is not necessarily occupied during each consecutive process cycle time. In fact, the operation of the work station skipping device 150 includes presetting the open or unoccupied second carriage $120_2$ (and thus an open or unoccupied work station) directly ahead of the designated load 124X in the direction of conveyance A. Although the description continued below makes reference to a single designated load 124X that skips the designated dip tank 30X, it should be noted that there may be multiple loads 124X designated to skip the designated dip tank 30X by repeated operation of the work station skipping device 150. If the system is to process multiple loads 124X designated for skipping the designated dip tank 30X, it is preferable for these loads to be located consecutively in a batch so that the number of vacancies along the conveyor system 20 is minimized. It is also noted that, within some constructions of the invention, one or more of the designated loads 124X can skip multiple designated ones of the work stations 28A-F. In one such construction, the work station skipping device 150 can transport a designated load 124X across multiple consecutive work stations, independently of the conveyor rails 116. Further, in some constructions, the conveyor system 20 includes two or more work station skipping devices 150 at different locations along the direction of conveyance A.

Figure 5:
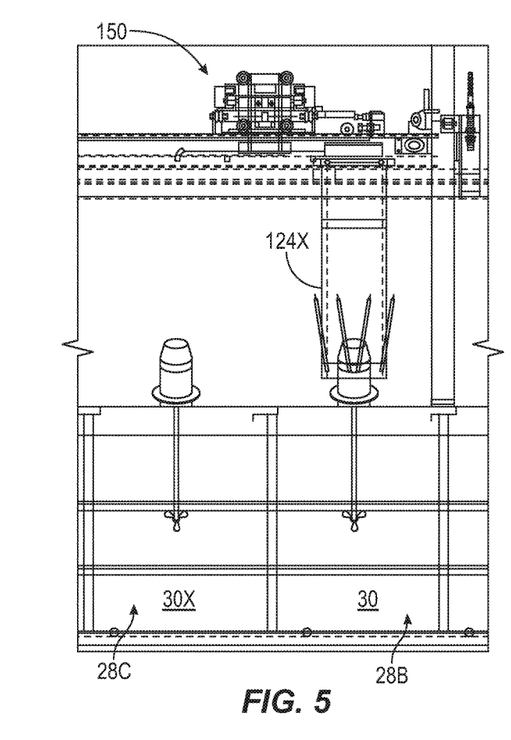
FIG. 5 illustrates a process configuration prior to operation of the work station skipping device to cause a designated load to skip a designated tank.
Figure 6:
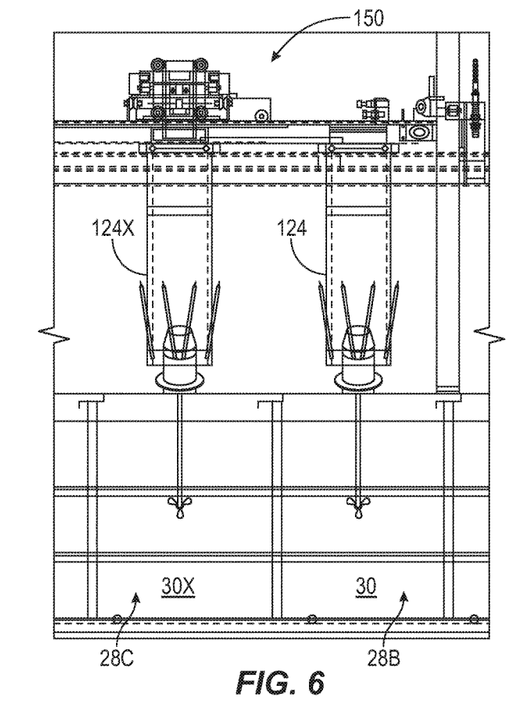
FIG. 6 illustrates the normal conveyance of the designated load to the location of the designated tank, along with registration of the work station skipping device.
Figure 7:
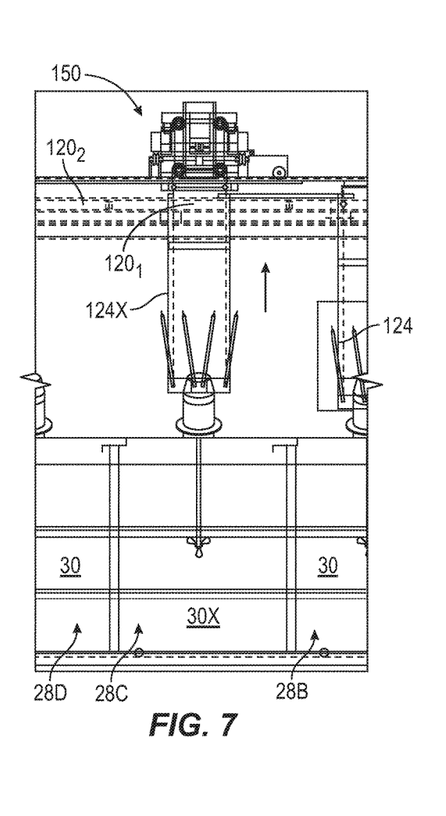
FIG. 7 illustrates the work station skipping device disengaging the designated load from its carriage on the conveyor.
Figure 8:
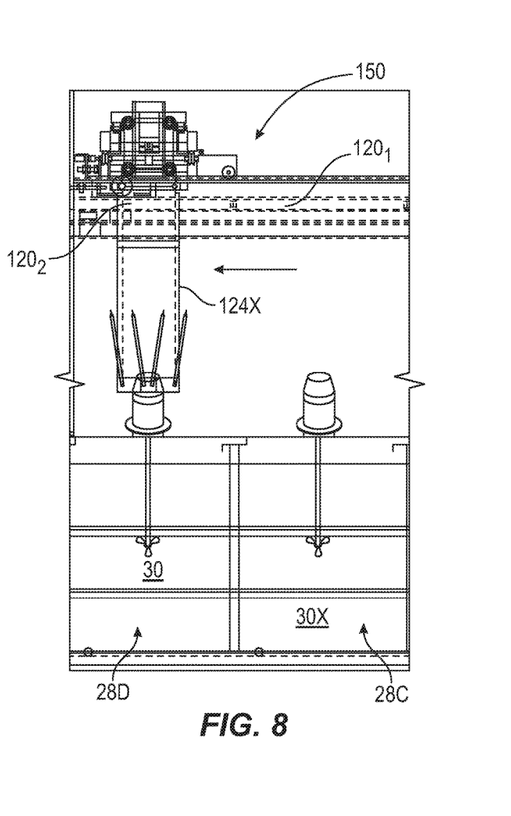
FIG. 8 illustrates the work station skipping device advancing the designated load past the designated tank, irrespective of normal conveyor indexing. The designated load is put into registration with an alternate carriage, which is initially unloaded.
Figure 9:
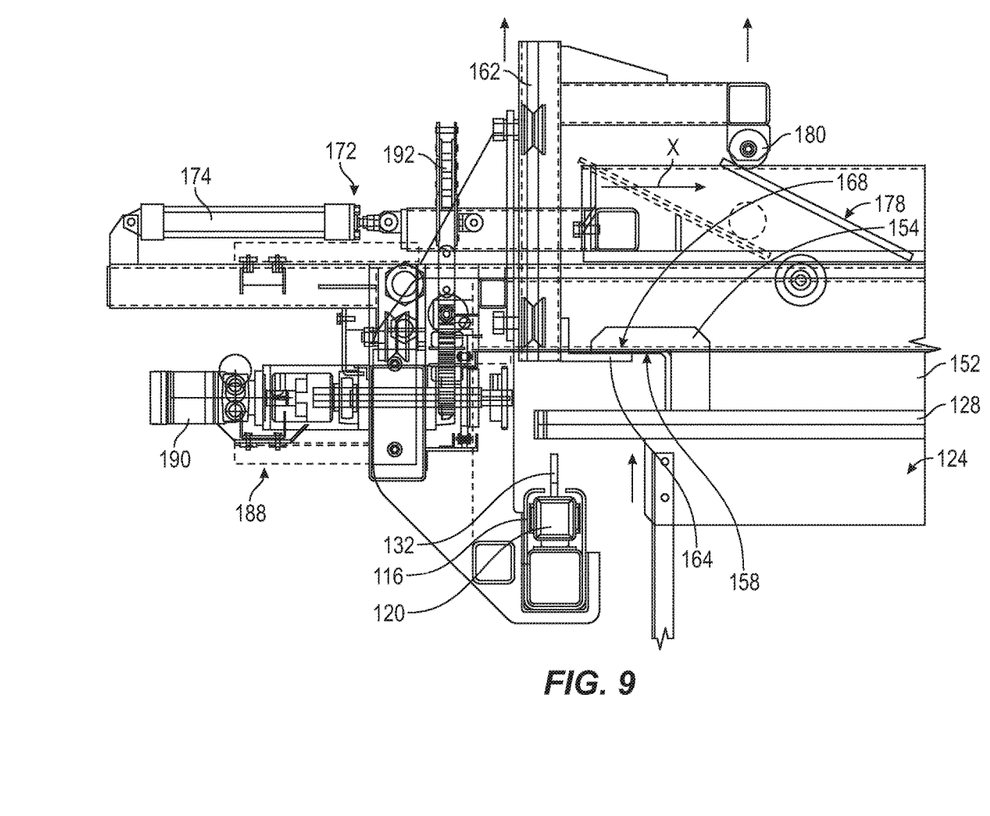
FIG. 9 is a detail end view showing the designated load disengaged from the carriage by the work station skipping device as in the steps of FIGS. 7 and 8.
Figure 10:
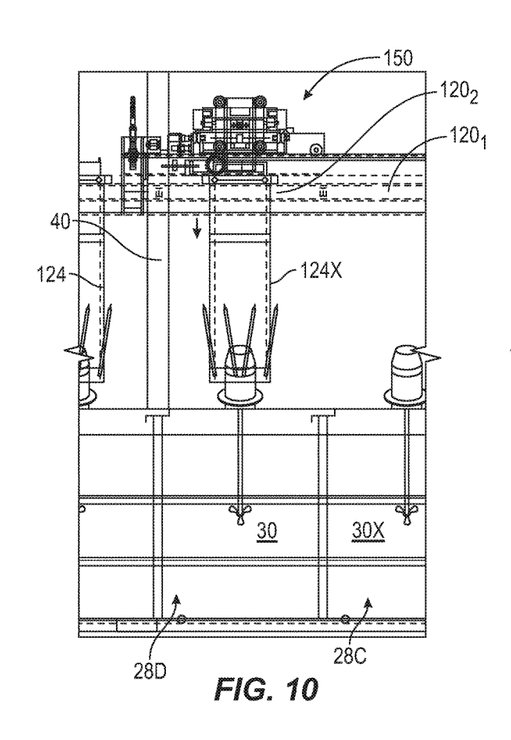
FIG. 10 illustrates the work station skipping device engaging the designated load with the alternate carriage.
Figure 11:
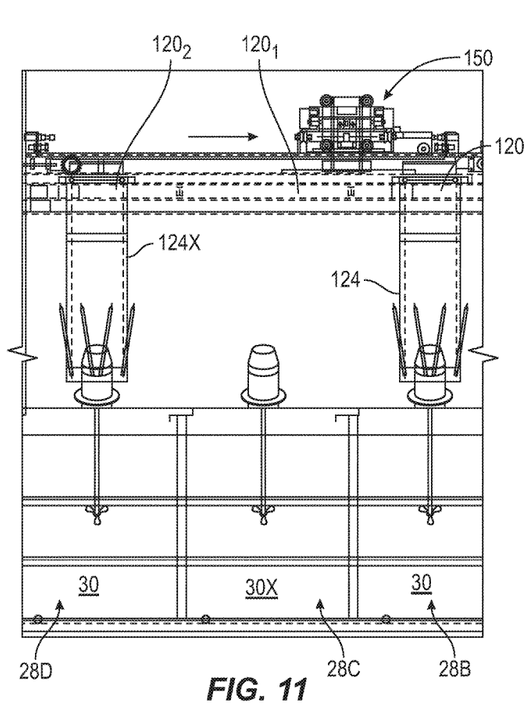
FIG. 11 illustrates the work station skipping device returning to a home position following the drop-off of the designated load.
Figure 12:
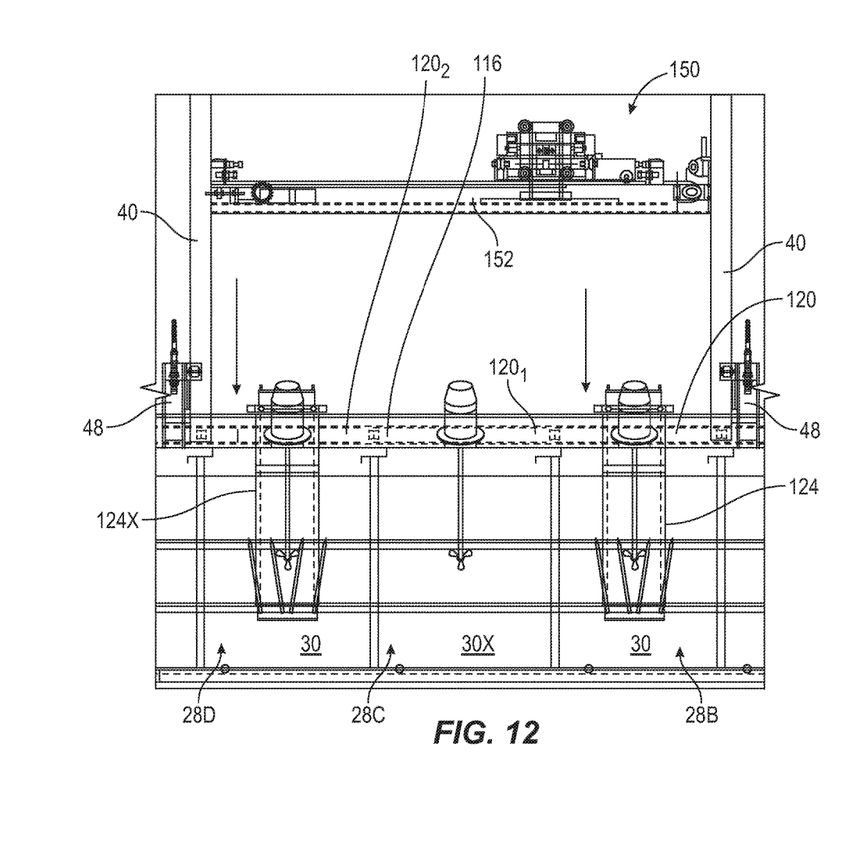
FIG. 12 illustrates the rails of the conveyor system being lowered by a process lift to immerse the loads into the dip tanks of the corresponding work stations.

As shown in FIG. 1 and in more detail in FIG. 5, the processing of the designated load 124X at a work station 28B directly preceding the work station 28C having the designated dip tank 30X to be skipped has just been completed. Thus, the conveyor system 20 is ready to index one position, according to its normal function so that the designated load 124X is briefly brought into register with the work station 28C having the designated dip tank 30X to be skipped. FIG. 6 illustrates the state immediately following the indexing as such. As can also be seen in FIG. 6, the work station skipping device 150 has advanced slightly from a home position of FIG. 5. In the ready position of FIG. 6, the work station skipping device 150 is positioned so that the lifting flanges 164 are in register with the lift flanges 154 of the designated load 124X (i.e., positioned directly beneath). As shown in FIG. 7, the work station skipping device 150 is operated, by energization of the lifting drive 172, to raise the designated load 124X with respect to the conveyor rails 116. This occurs by lifting the designated load 124X out of engagement from the carriage support section 132 of the first carriage 120₁ (e.g., lifting of the load bars 128 above the notches 136). Thus, without changing the elevation of the rails 116, the designated load 124X is lifted with respect to adjacent loads 124. Now free from the first carriage 120₁, the work station skipping device 150 is operated, by energization of the advancing drive 188, to transport the designated load 124X forward in the direction of conveyance A, with respect to the adjacent loads 124, by an additional index length L. The result of this action is that, as shown in FIG. 8, the designated load 124X is brought into register with the work station 28D immediately downstream of the designated dip tank 30X. As such, the load bars 128 of the designated load 124X are brought into register with the notches 136 of the awaiting, vacant second carriage 120₂. FIG. 9 illustrates, in end view, one side of the work station skipping device 150 corresponding to the state of FIGS. 7 and 8 in which the designated load 124X is elevated to space the load bars 128 above the carriages 120. Because the dip tank 30 of the work station 28D is intended to process the designated load 124X (unlike the designated dip tank 30X), the work station skipping device 150 is then operated, by reversal of the lifting drive 172, to lower the designated load 124X onto the second carriage 120₂ as shown in FIG. 10. Upon drop-off of the designated load 124X, FIG. 11 illustrates the return travel of the work station skipping device 150 toward the home position. One or more of the operations of the work station skipping device 150 can be carried out while the conveyor system 20 is otherwise at rest, i.e., the carriages 120 remain stationary along the rails 116. With the designated dip tank 30X effectively skipped, the operation of the finishing process line 24 continues according to its normal operation to lower the rails 116 so that the plurality of loads 124 thereon are immersed in their respective dip tanks 30 as shown in FIG. 12. As shown, the designated dip tank 30X will remain vacant for the duration of the process cycle time following the skipping operation. The designated load 124X does not spend the entire process cycle time in the space directly above the designated dip tank 30X as it would if the designated load 124X was only separated from the lowering action of the rails 116 to avoid immersion during the process cycle time, while keeping its originally indexed position. Aside from the brief duration corresponding to the time required to pick up the designated load 124X with the work station skipping device 150, the designated load 124X does not occupy the work station 28C having the designated dip tank 30X.

Various features of the invention are set forth in the following claims.

What is claimed is:

1. A conveyor system comprising:
   a rail defining a path of conveyance;
   a plurality of sequential work stations positioned along the path of conveyance;
   a plurality of carriages slidable along the rail, the plurality of carriages including
   a first carriage supporting a load through the plurality of sequential work stations, and
   a second carriage in a leading or downstream position with respect to the first carriage, the second carriage being unloaded;
   an indexing system adapted to drive the plurality of carriages in discrete steps, each step advancing the plurality of carriages by an index length equal to a length of each of the plurality of sequential work stations; and
   a work station skipping device operable to engage the load and transfer the load from the first carriage to the second carriage for skipping over a predetermined one of the plurality of sequential work stations.

2. The conveyor system of claim 1, wherein the plurality of carriages are arranged in end-to-end relationship with each other along the rail.

3. The conveyor system of claim 1, wherein each of the plurality of carriages includes a first portion at least partially contained by the rail and a support portion extending from the first portion, the support portion having a notch in which a load bar of the load is received.

4. The conveyor system of claim 3 wherein the work station skipping device has a lifting flange adapted to engage a lift flange of the load to lift the load off the first carriage, wherein the lifting flange is part of a lift bar operable to be lifted from a lowered position to a lifted position by a lifting drive.

5. The conveyor system of claim 4, wherein the lift flange of the load is free from contact when the lift bar is in the lowered position.

6. The conveyor system of claim 5, wherein at least one drive mechanism of the work station skipping device is operable to advance the load, with respect to the rail, from the first carriage to the second carriage and to deposit the load onto the second carriage so that the load bar is received into the notch of the second carriage.

7. The conveyor system of claim 1, wherein the work station skipping device has an advancing stroke equal to the index length.

8. The conveyor system of claim 1, wherein the work station skipping device includes a lifting drive operable to raise and lower the load with respect to the first and second carriages, and the work station skipping device further includes an advancing drive operable to transfer the load from the position of the first carriage to the position of the second carriage, along the path of conveyance.

9. The conveyor system of claim 1, further comprising a stationary frame including a plurality of fixed posts, wherein a process lift is operable to raise and lower the rail relative to the plurality of sequential work stations, including a liquid immersion dip tank located within the predetermined one of the plurality of sequential work stations.

10. The conveyor system of claim 1, wherein each of the plurality of sequential work stations includes a respective liquid immersion dip tank.

11. The conveyor system of claim 10, wherein the dip tank of the predetermined one of the plurality of sequential work stations is an acid bath containing an acidic liquid solution.

12. A method of operating a conveyor system of a finishing process line having a plurality of sequential work stations for processing a plurality of conveyed loads, one of the plurality of sequential work stations defining a designated dip tank to be skipped by a designated one of the plurality of conveyed loads, the method comprising:

registering, with the conveyor system, the plurality of conveyed loads with the plurality of sequential work stations so that each of the plurality of loads is positioned above a respective dip tank corresponding to the plurality of sequential work stations;

performing, with the conveyor system, a first lowering of the plurality of conveyed loads, including the designated load, into the respective dip tanks;

raising, with the conveyor system, the plurality of conveyed loads out of the respective dip tanks;

indexing the conveyor system to bring the designated load into registry with the designated dip tank; and operating a work station skipping device to engage the designated load and transport the designated load to a work station of the plurality of sequential work stations that is downstream of the designated dip tank, wherein the operation of the work station skipping device occurs prior to a second lowering of the plurality of conveyed loads.

13. The method of claim 12, wherein the conveyor system comes to a stop after indexing and prior to the work station skipping device engaging the designated load for transport.

14. The method of claim 12, wherein the work station to which the work station skipping device transports the designated load is exactly one work station downstream of the designated dip tank.

15. The method of claim 12, wherein the work station skipping device includes a lifting bar with a lifting flange, and the designated load includes a lift flange, and wherein the lifting bar is raised to engage the lift flange of the designated load and raise the designated load out of engagement with a first carriage slidably engaged with a rail of the conveyor system.

16. The method of claim 15, wherein, once the designated load is transported, the lifting bar is subsequently lowered to disengage the lift flange of the designated load and lower the designated load into engagement with a second carriage slidably engaged with the rail of the conveyor system.

17. The method of claim 16, further comprising, after lowering the designated load into engagement with the second carriage, returning the work station skipping device to a home position in a direction opposite a direction of conveyance defined by the conveyor system and the plurality of sequential work stations.

18. An indexing conveyor system having a rail situated above a plurality of same-length work stations along a path of conveyance, the conveyor system comprising:

a work station skipping device operable to engage a load and transfer the load from a first conveyor carriage to a second, further downstream carriage so that the load skips over a predetermined one of the plurality of work stations.

19. The indexing conveyor system of claim 18, wherein the work station skipping device is operable to advance the load one additional work station length upon arrival of the load at the predetermined one of the plurality of work stations.

20. The indexing conveyor system of claim 18, wherein indexing conveyor system includes a plurality of carriages slidable along the rail, and wherein the work station skipping device is operable to lift the load out of engagement with a first one of the plurality of carriages and deposit the load into engagement with a second one of the plurality of carriages.

* * * * *